US009308864B2

(12) United States Patent
Cho et al.

(10) Patent No.: US 9,308,864 B2
(45) Date of Patent: Apr. 12, 2016

(54) VEHICLE AND CONTROL METHOD THEREOF

(71) Applicant: LG ELECTRONICS INC., Seoul (KR)

(72) Inventors: Eunhyung Cho, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/313,683

(22) Filed: Jun. 24, 2014

(65) Prior Publication Data

US 2015/0321607 A1    Nov. 12, 2015

(30) Foreign Application Priority Data

May 8, 2014   (KR) ........................ 10-2014-0054697

(51) Int. Cl.
| | |
|---|---|
| *B60R 1/00* | (2006.01) |
| *B60R 11/02* | (2006.01) |
| *B60R 11/04* | (2006.01) |
| *H04N 5/247* | (2006.01) |
| *G06F 3/0484* | (2013.01) |
| *B60R 11/00* | (2006.01) |

(52) U.S. Cl.
CPC ............... *B60R 1/00* (2013.01); *B60R 11/0229* (2013.01); *B60R 11/04* (2013.01); *G06F 3/04847* (2013.01); *H04N 5/247* (2013.01); *B60R 2011/0003* (2013.01)

(58) Field of Classification Search
CPC ........................................................ B60R 1/00
USPC ........................................................ 348/345
See application file for complete search history.

(56) References Cited

U.S. PATENT DOCUMENTS

| | | | |
|---|---|---|---|
| 5,500,904 A | 3/1996 | Markandey et al. | |
| 7,126,583 B1 * | 10/2006 | Breed | ............................ 345/158 |
| 7,953,513 B2 * | 5/2011 | Bhat et al. | ...................... 700/197 |
| 8,031,225 B2 * | 10/2011 | Watanabe | ................. B60R 1/00 |
| | | | 348/143 |
| 8,350,724 B2 * | 1/2013 | Szczerba et al. | ............ 340/932.2 |
| 8,466,893 B2 * | 6/2013 | Hollemans | .............. G06F 3/044 |
| | | | 178/18.01 |
| 8,757,807 B1 * | 6/2014 | Disley | .................... G03B 29/00 |
| | | | 353/13 |
| 8,868,329 B2 * | 10/2014 | Ikeda | ..................... G01C 21/00 |
| | | | 701/33.4 |
| 8,947,454 B2 * | 2/2015 | Hashikawa | ............ B60K 35/00 |
| | | | 340/425.5 |
| 2005/0052426 A1 * | 3/2005 | Hagermoser | .......... B60K 35/00 |
| | | | 345/173 |
| 2005/0163348 A1 | 7/2005 | Chen | |
| 2013/0147840 A1 | 6/2013 | Seder et al. | |
| 2014/0063064 A1 | 3/2014 | Seo et al. | |

FOREIGN PATENT DOCUMENTS

| | | |
|---|---|---|
| EP | 0 886 245 A2 | 12/1998 |
| EP | 0 804 779 B1 | 3/2006 |

OTHER PUBLICATIONS

Google patent search history log.pdf.*

* cited by examiner

*Primary Examiner* — William C Vaughn, Jr.
*Assistant Examiner* — Luis Perez Fuentes
(74) *Attorney, Agent, or Firm* — Birch, Stewart, Kolasch & Birch, LLP

(57) ABSTRACT

Disclosed is a control method of a vehicle, including displaying a first image sequence including plural images captured by a first camera unit and a first control interface on a first display unit, and displaying a second image sequence including plural images captured by a second camera unit and a second control interface on a second display unit. Here, the first display unit and the second display unit may be located in directions facing each other, and arrangement of control objects included in the first control interface and arrangement of control objects included in the second control interface may be differently set.

23 Claims, 14 Drawing Sheets

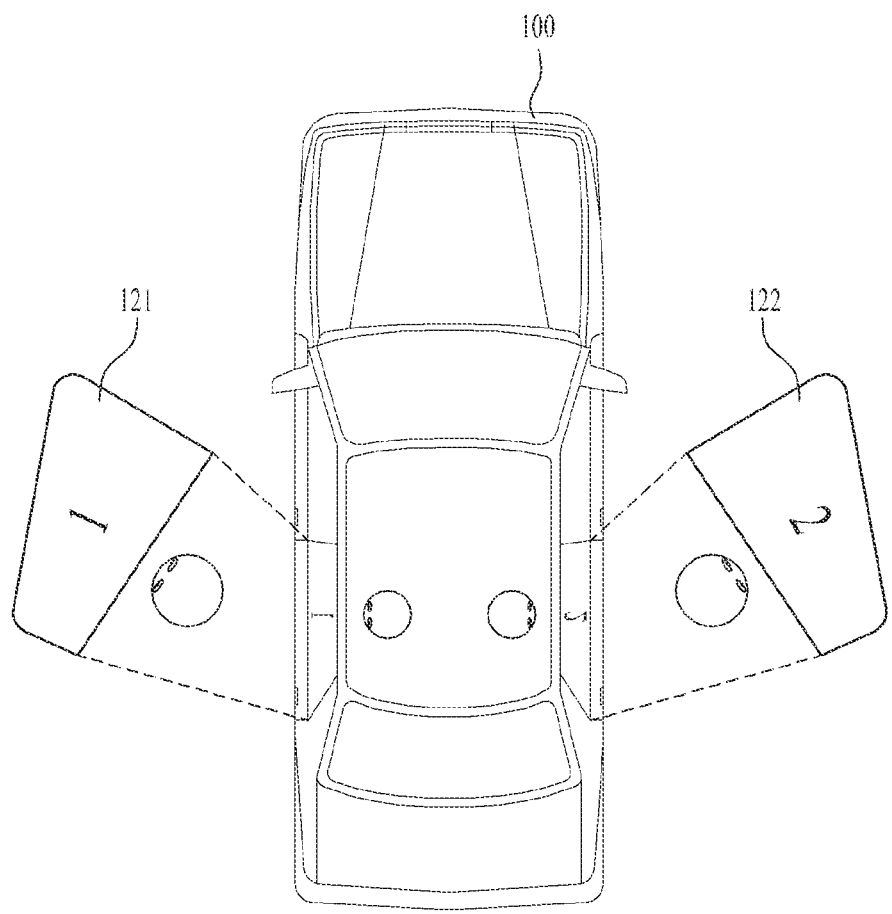

(a)

(b)

(c)

(d)

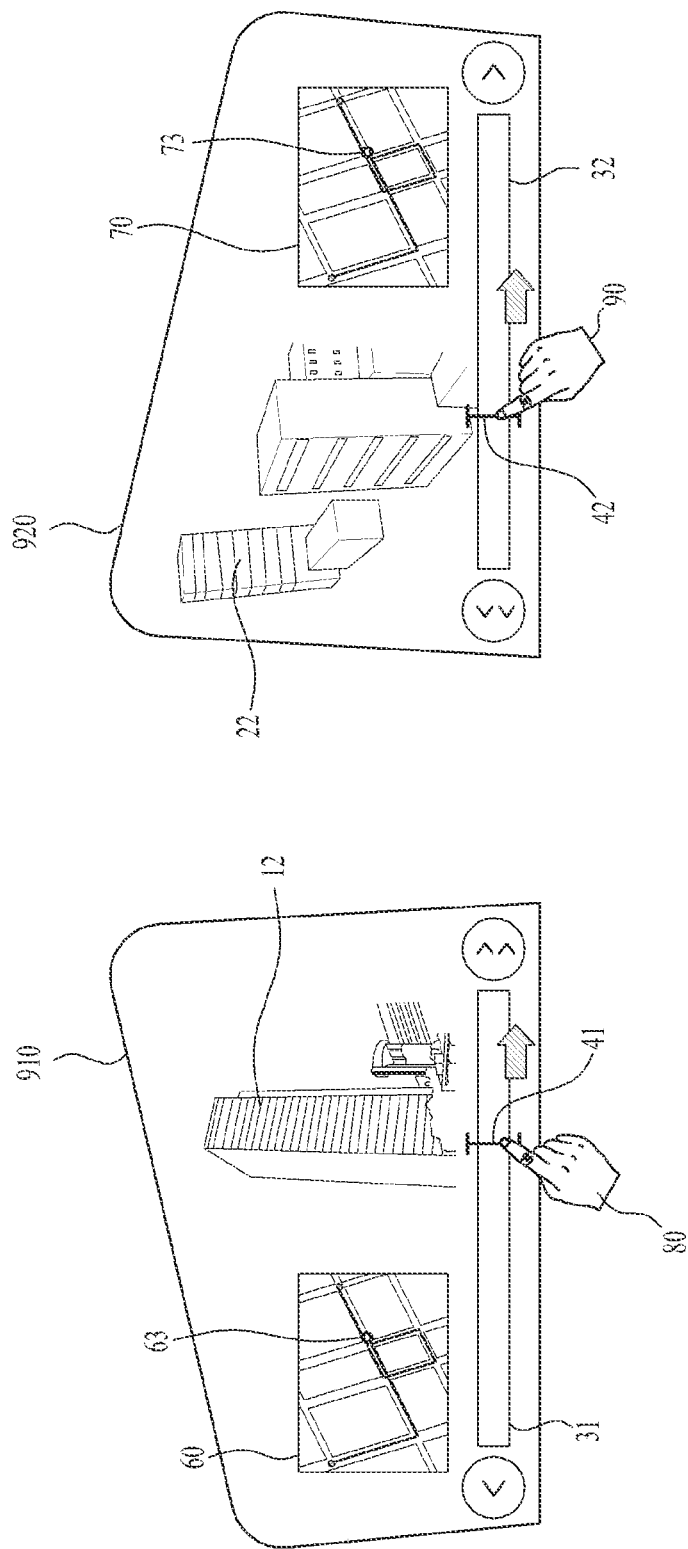

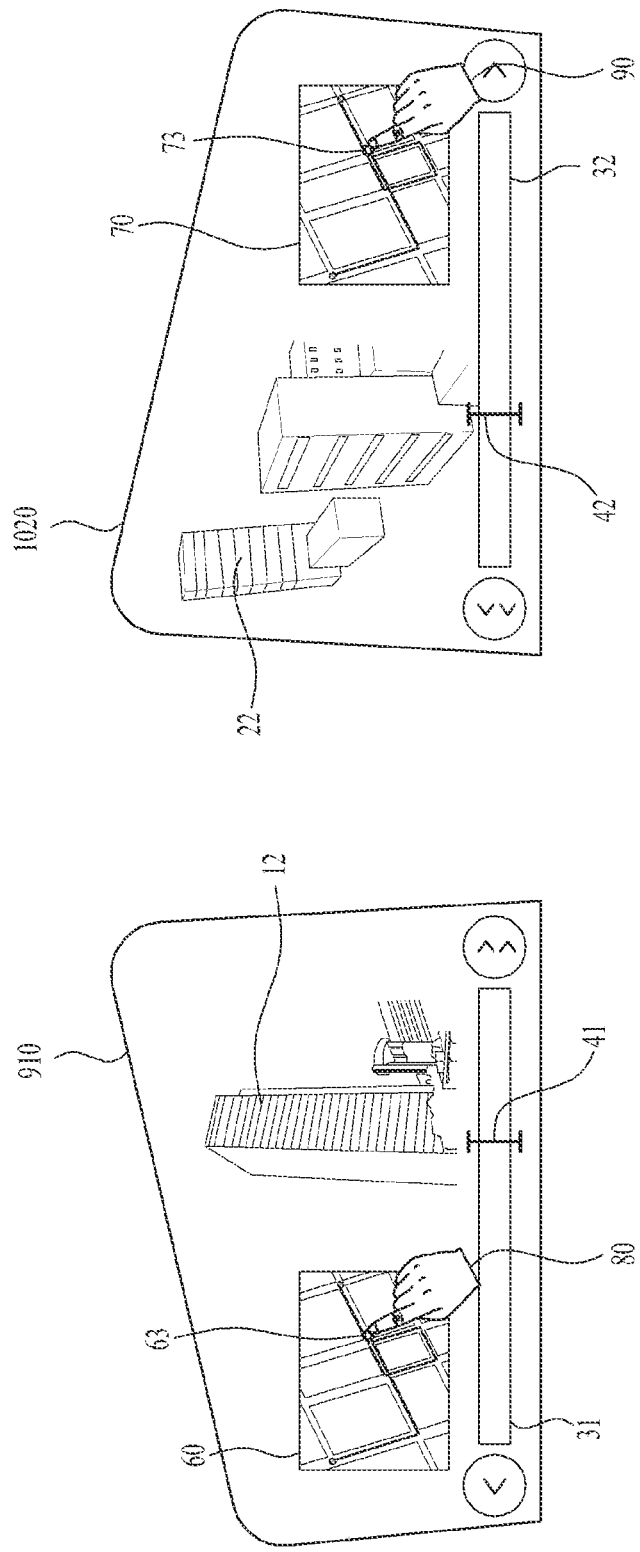

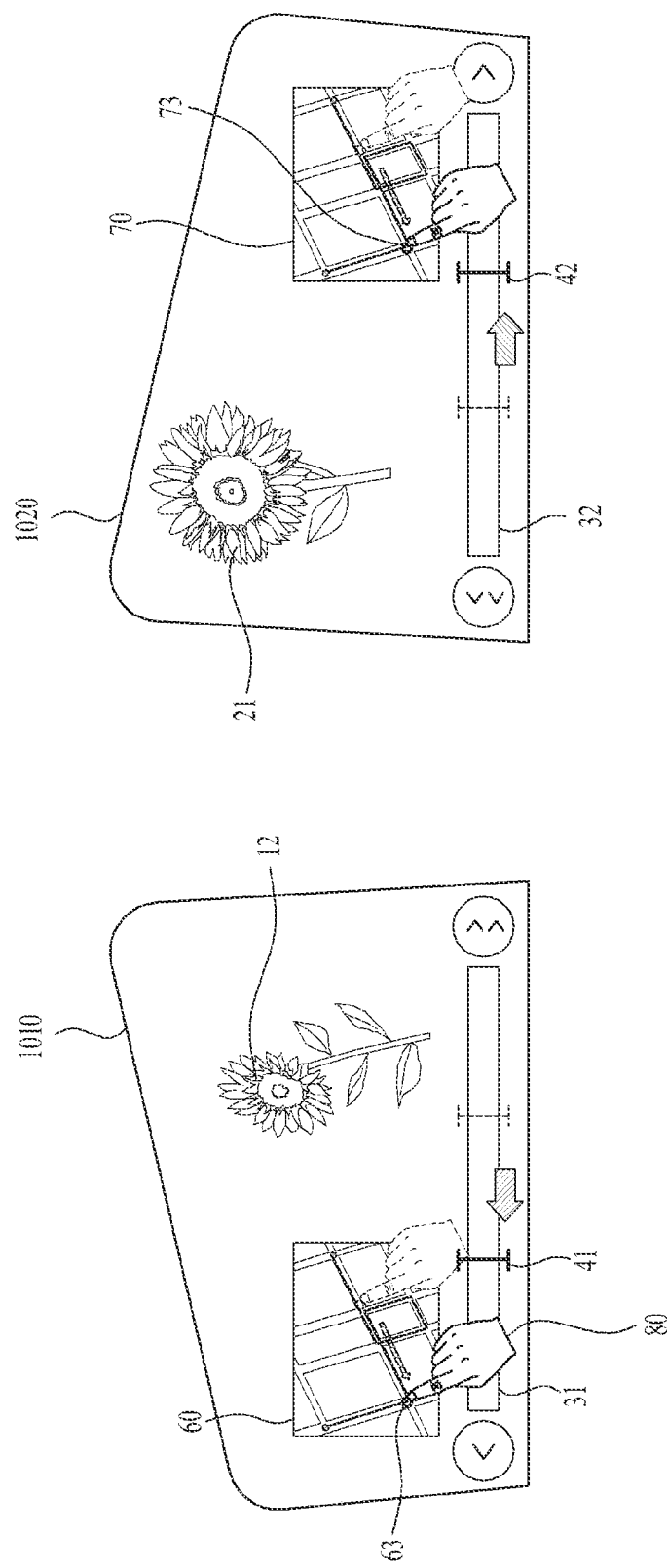

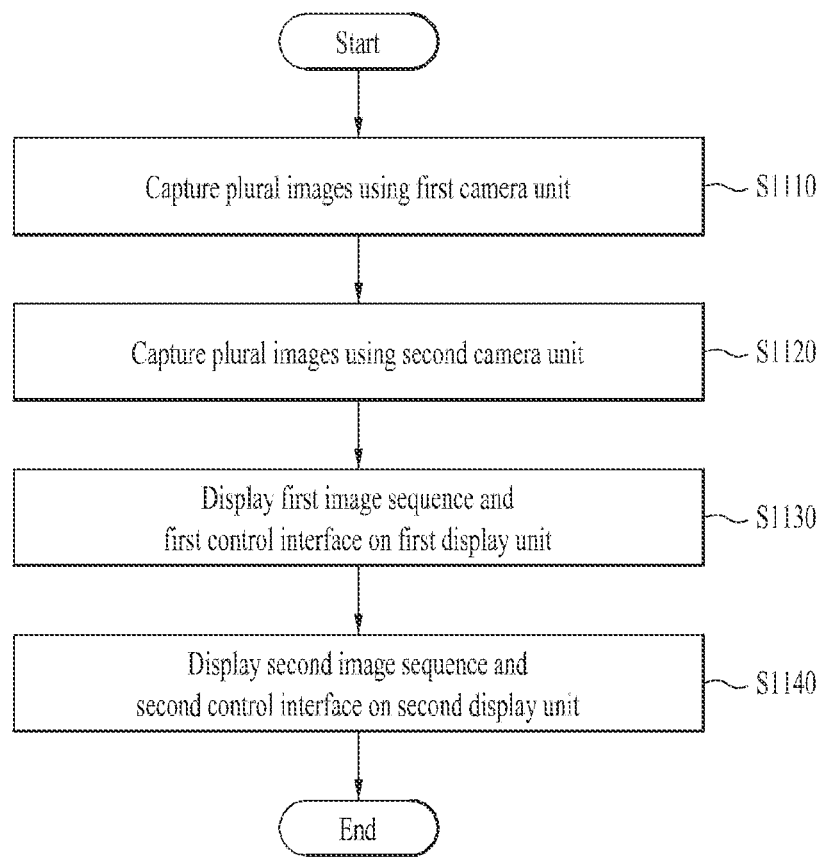

VEHICLE AND CONTROL METHOD THEREOF

This application claims the benefit of Korean Patent Application No. 10-2014-0054697, filed on, May 8, 2014, which is hereby incorporated by reference as if fully set forth herein.

BACKGROUND OF THE INVENTION

1. Field of the Invention

The present specification relates to a vehicle, and more particularly to a vehicle having image capture and image display functions and a control method thereof.

2. Discussion of the Related Art

With recent technical development, a vehicle has been used as a smart device that captures surrounding images and displays the captured images and the like. For example, in such a vehicle, a vehicle window is constructed of a transparent display unit and serves to display images captured via a camera unit mounted to the exterior of the vehicle.

When a display unit mounted in the vehicle displays an image, the display unit must display an image, a control interface and the like differently from conventional display devices in consideration of vehicle progress or a position of the display unit. For example, a display unit installed in a left region of the vehicle and a display unit installed in a right region of the vehicle must display an image, a control interface and the like in different schemes and arrangements.

SUMMARY OF THE INVENTION

Accordingly, the present specification is directed to a vehicle and a control method thereof that substantially obviate one or more problems due to limitations and disadvantages of the related art.

An object of the present specification is to provide a vehicle in which a first display unit and a second display unit, which are arranged to face each other, display images, control interfaces and the like in different display schemes and a control method thereof.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

In accordance with one embodiment of the present specification, a vehicle configured to provide image display, includes a plurality of camera units configured to capture plural images, a plurality of display units configured respectively to display an image sequence including the plural images and a control interface controlling display of the image sequence, and a processor configured to control the camera units and the display units. The control interface may include a first object and a second object, the first object configured to control operation to display a past image on the display unit, the past image preceding a current image displayed on the display unit in time, and the second object configured to control operation to display a future image on the display unit, the future image following the current image displayed on the display unit in time. In addition, the processor may display a first image sequence including plural images captured by a first camera unit and a first control interface controlling display of the first image sequence on a first display unit, and may display a second image sequence including plural images captured by a second camera unit and a second control interface controlling display of the second image sequence on a second display unit. In this case, the first display unit and the second display unit may be located in directions facing each other. In addition, the first object on the first control interface may be displayed at the left of the second object on the first control interface, and the first object on the second control interface may be displayed at the right of the second object on the second control interface.

In accordance with one embodiment of the present specification, a control method of a vehicle, the vehicle being configured to provide image display, includes capturing plural images using a first camera unit, capturing plural images using a second camera unit, displaying a first image sequence including the plural images captured by the first camera unit and a first control interface controlling display of the first image sequence on a first display unit, and displaying a second image sequence including the plural images captured by the second camera unit and a second control interface controlling display of the second image sequence on a second display unit. Here, the first display unit and the second display unit may be located in directions facing each other, each of the first control interface and the second control interface may include a first object and a second object, the first object configured to control operation to display a past image preceding a current image displayed on the first display unit or the second display unit in time, and the second object configured to control operation to display a future image following the current image displayed on the first display unit or the second display unit in time. In addition, the first object on the first control interface may be displayed at the left of the second object on the first control interface, and the first object on the second control interface may be displayed at the right of the second object on the second control interface.

It is to be understood that both the foregoing general description and the following detailed description of the present specification are exemplary and explanatory and are intended to provide further explanation of the present specification as claimed.

BRIEF DESCRIPTION OF THE DRAWINGS

The accompanying drawings, which are included to provide a further understanding of the present specification and are incorporated in and constitute a part of this application, illustrate embodiment(s) of the present specification and together with the description serve to explain the principle of the present specification. In the drawings:

FIGS. 1A-1B show a method of capturing images and displaying the captured images by a vehicle according to one embodiment of the present specification;

FIGS. 9A-9B show a method of displaying an image sequence and a vehicle indicator by the vehicle when an image indicator is moved according to one embodiment of the present specification;

FIGS. 10A-10B show a method of displaying an image sequence and an image indicator by the vehicle when a vehicle indicator is moved according to one embodiment of the present specification; and FIG. 11 is a flowchart of a control method of a vehicle according to one embodiment of the present specification.

DETAILED DESCRIPTION OF THE INVENTION

Hereinafter, the embodiments will be described in detail with reference to the accompanying drawings and content described in the accompanying drawings, but the scope of the claims is not limited or restricted by the embodiments.

Although the terms used in the present specification are selected, as much as possible, from general terms that are widely used at present while taking into consideration the functions, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the present specification. Accordingly, it should be noted that the terms used herein should be construed based on practical meanings thereof and the whole content of this specification, rather than being simply construed based on names of the terms.

In the present specification, vehicles may mean various kinds of transportation means equipped with camera units and display units. For example, vehicles may include automobiles, trains, airplanes, helicopters and the like equipped with camera units and display units. In the present specification, an image sequence may be a set of plural images captured by a camera unit and may include sequence information regarding a display sequence of plural images.

Figure 1A:
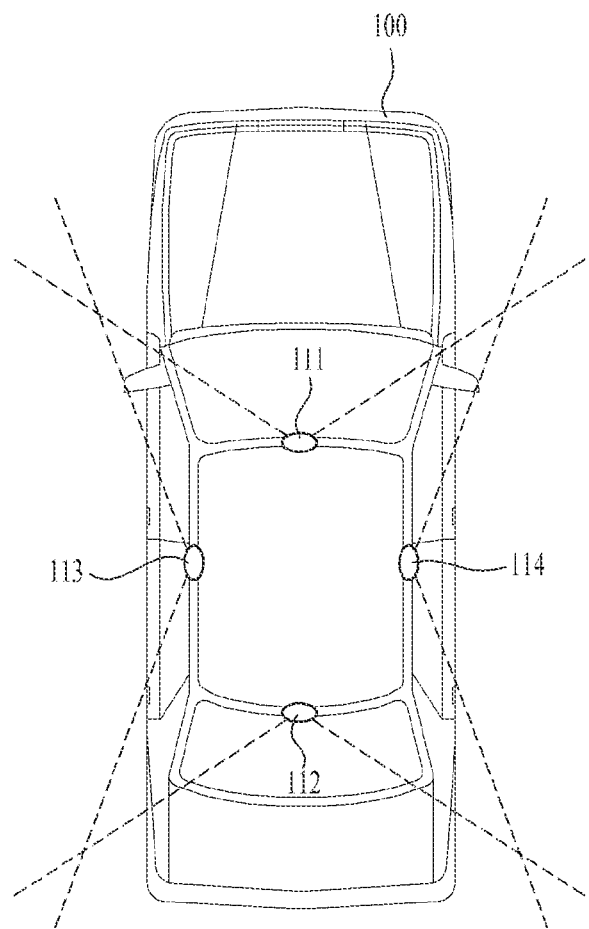

FIG. 1 shows a method of capturing images and displaying the captured images by a vehicle according to one embodiment of the present specification. More specifically, FIG. 1A shows a method of capturing images via a camera unit by the vehicle according to one embodiment of the present specification, and FIG. 1B shows a method of displaying images on a display unit by the vehicle according to one embodiment of the present specification.

Referring to FIG. 1A, the vehicle 100 may include a plurality of camera units. Specifically, the vehicle 100 may include a plurality of camera units 110 at various positions to capture various images around the vehicle 100. For example, the vehicle 100 may include a front camera unit 111 installed at the front side of the vehicle 100, a rear camera unit 112 installed at the rear side of the vehicle 100, a first lateral camera unit 113 installed at the left side of the vehicle 100 and a second lateral camera unit 114 installed at the right side of the vehicle 100.

The plural camera units may capture plural images within a view angle range of each camera unit. For example, the front camera unit 111 may capture plural images in front of the vehicle 100 within a view angle range thereof, the rear camera unit 112 may capture plural images at the rear of the vehicle 100 within a view angle range thereof, the first lateral camera unit 113 may capture plural images at the left of the vehicle 100 within a view angle range thereof, and the second camera unit 114 may capture plural images at the right of the vehicle 100 within a view angle range thereof. In this case, the view angle range of the front camera unit 111 may overlap the view angle ranges of the first lateral camera unit 113 and the second lateral camera unit 114 to some extent, and the view angle range of the rear camera unit 112 may overlap the view angle ranges of the first lateral camera unit 113 and the second lateral camera unit 114 to some extent. In this way, the vehicle 100 may capture various images around the vehicle 100 within a range of 360 degrees.

In addition, the plural camera units may be activated only during driving of the vehicle 100.

Referring to FIG. 1B, the vehicle 100 may include a plurality of display units. For example, the vehicle 100 may include a first display unit 121 installed in a left interior region of the vehicle 100 and a second display unit 122 installed in a right interior region of the vehicle 100. In this case, the plural display units may be transparent display units. For example, the plural display units may be transparent display units installed to an inner surface of a left window or a right window of a passenger seat.

The plural display units may display plural images captured by plural camera units respectively. For example, the first display unit 121 may display plural images captured by a first camera unit and the second display unit 122 may display plural images captured by a second camera unit. Here, the first camera unit may be the aforementioned first lateral camera unit installed at the left side of the vehicle 100 and the second camera unit may be the aforementioned second lateral camera unit installed at the right side of the vehicle 100. In this way, plural images in several directions around the vehicle 100 may be displayed on the plural display units 120 installed in the respective directions.

In addition, the plural display units 120 may be activated only when the plural camera units are activated.

Figure 2:
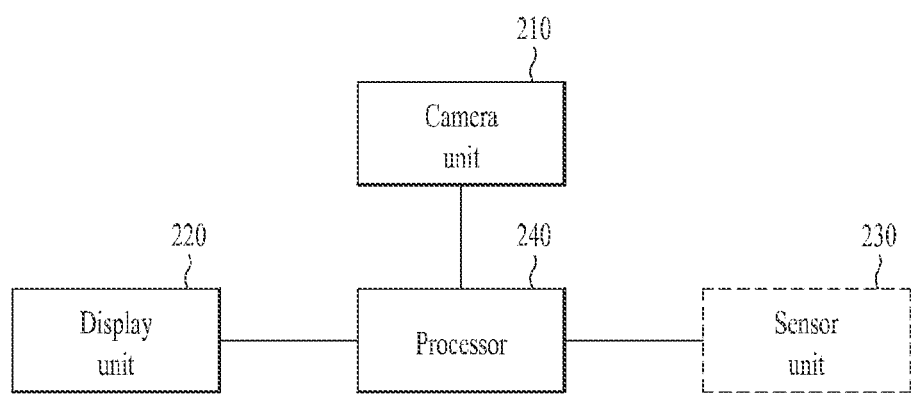
FIG. 2 is a view showing a configuration of a vehicle according to one embodiment of the present specification.

FIG. 2 is a view showing a configuration of a vehicle according to one embodiment of the present specification.

Referring to FIG. 2, the vehicle may include a plurality of camera units 210, a plurality of display units 220, a sensor unit 230 and a processor 240. Here, the sensor unit 230 is optional. In addition, the vehicle may include various other components required for driving of the vehicle.

The plural camera units 210 may include a first camera unit and a second camera unit. In this case, the first camera unit and the second camera unit may be installed to face opposite directions. For example, the first camera unit may be installed to face the left of the vehicle and the second camera unit may be installed to face the right of the vehicle. In addition, the first camera unit and the second camera unit may be installed to capture images respectively in two directions perpendicular to a progress direction of the vehicle. For example, the first camera unit may be installed to capture images at the left of the vehicle and the second camera unit may be installed to capture images at the right of the vehicle.

In this case, when the vehicle begins to drive, the plural camera units 210 may be activated. In addition, when the vehicle is not moved for a predetermined time or more, the plural camera units 210 may be deactivated.

The plural display units 220 may include a first display unit and a second display unit. In this case, the first display unit and the second display unit may be located in directions facing each other. The display units 220 may be activated when the camera units 210 are activated.

The first display unit may display a first image sequence including plural images captured by the first camera unit, and the second display unit may display a second image sequence including plural images captured by the second camera unit. In this case, the first display unit and the second display unit may respectively display the first image sequence and the second image sequence in a video format or a panorama image format. Here, the panorama image format may refer to a format that displays plural images included in an image sequence by stitching the plural images into one image without overlapping regions.

The plural display units 220 may respectively display control interfaces to control display of the respective image sequences. For example, the first display unit may display a first control interface to control display of the first image sequence and the second display unit may display a second control interface to control display of the second image sequence. In this case, each control interface may include a first object, a second object and a progress bar. Here, the first object configured to control operation to display a past image, which precedes a current image displayed on the display unit in time, and the second object configured to control operation to display a future image, which follows the current image displayed on the display unit in time. In addition, the first object and the second object are displayed object based on the control interface. More specifically, the processor may execute the operation when the processor detects a control input selecting the object. And, for example, the object may correspond to a virtual button, a soft button, a icon, and so on. Moreover, the object may correspond to a object configured to execute operation based on the control input, and this will not be limited only to the exemplary embodiments presented herein. This will be described below in detail with reference to FIGS. 4 and 5.

The progress bar may be a time-based progress bar or a distance-based progress bar. This will be described below in detail with reference to FIG. 3.

The plural display units 220 may respectively further display path interfaces that indicate a movement path of the vehicle. For example, the first display unit and the second display unit may further display the same path interface that indicates a movement path of the vehicle. In the following description, for convenience, a path interface displayed on the first display unit is referred to as a first path interface and a path interface displayed on the second display unit is referred to as a second path interface. In this case, the first path interface and the second path interface may respectively include vehicle indicators that indicate a movement path of the vehicle, a map image corresponding to the movement path of the vehicle and the state of the vehicle on the movement path. This will be described below in detail with reference to FIGS. 6 and 7.

According to embodiments, the display units 220 may include at least one of Light Emitting Diode (LED), Organic Light Emitting Diode (OLED), Liquid Crystal Display (LCD), electronic ink and flexible display devices. In addition, the display units 220 may include touch sensitive display units and detect user input of touching the display unit 220.

The sensor unit 230 may sense at least one of surrounding environment of the vehicle and user input. The sensor unit 230 may sense at least one of surrounding environment of the vehicle and user input using at least one sensing means included in the vehicle and transmit the sensed result to the processor 240. The at least one sensing means may include a gravity sensor, a motion sensor, a gyroscopic sensor, an accelerometer, an infrared sensor, an inclination sensor, a bending sensor, an audio sensor, a video sensor, an image sensor, a Global Positioning System (GPS) sensor, a touch sensor and the like. The aforementioned sensors may be included as separate elements in the vehicle, or may be integrated into at least one element and included in the vehicle.

The sensor unit 230 may detect control input to the plural display units 220. For example, the sensor unit 230 may detect control input to the first display unit and control input to the second display unit. More specifically, the sensor unit 230 may detect control input of controlling the first object and the second object on the control interface. In addition, the sensor unit 230 may detect control input of controlling an image indicator on the control interface. The sensor unit 230 may further detect control input of controlling the vehicle indicator on the path interface. This will be described below in detail with reference to FIGS. 8 and 9.

In addition, the sensor unit 230 may detect a movement speed of the vehicle.

The processor 240 may control at least one unit included in the vehicle. More specifically, the processor 240 may control the aforementioned respective units and control transmission and/or reception of data between the respective units.

The processor 240 may display at least one image included in an image sequence on the display unit 220. For example, the processor 240 may display at least one image included in the first image sequence on the first display unit and display at least one image included in the second image sequence on the second display unit.

The processor 240 may further display the control interface on the display unit 220. For example, the processor 240 may display the first control interface on the first display unit and display the second control interface on the second display unit.

The processor 240 may further display the path interface on the display unit 220. For example, the processor 240 may display the first path interface on the first display unit and display the second path interface on the second display unit. Here, the first path interface and the second path interface may be the same path interface as described above.

In addition, the processor 240 may detect control input to the display unit 220 via the sensor unit 230. For example, the processor 240 may detect control input to the first display unit and detect control input to the second display unit.

The above operations of the processor 240 will be described below in detail with reference to the respective drawings. In the following description, the processor 240 may be described as controlling the vehicle or at least one unit included in the vehicle, and the processor 140 and the vehicle may be regarded in the same light.

Figure 3:
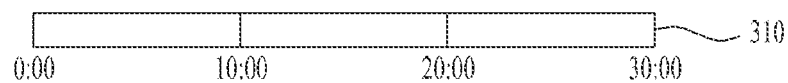
FIG. 3 shows progress bars according to one embodiment of the present specification.
Figure 3:
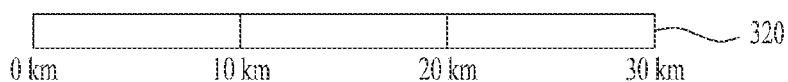
Figure 3:
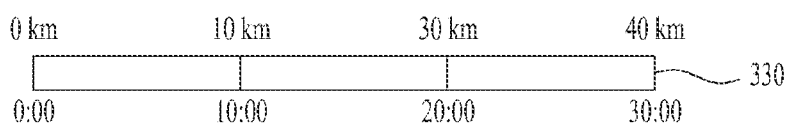
Figure 3:
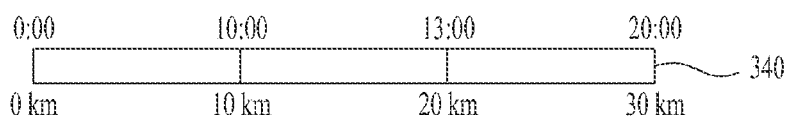

FIG. 3 shows progress bars according to one embodiment of the present specification.

Referring to (a) of FIG. 3, a progress bar 310 may be a time-based progress bar. When the progress bar 310 is a time-based progress bar, the vehicle may display captured images in a video format. For example, when the progress bar 310 is a time-based progress bar, the vehicle may display the first image sequence on the first display unit in a video format and display the second image sequence on the second display unit in a video format. In this case, the vehicle may display captured images at the same frame rate as an image capture frame rate. In addition, the vehicle may display captured images at a different frame rate than the image capture frame rate.

In addition, when the progress bar 310 is a time-based progress bar, a position of an image indicator on the progress bar 310 may indicate time when a current image displayed on the display unit is captured.

Referring to (b) of FIG. 3, a progress bar 320 may be a distance-based progress bar. When the progress bar 320 is a distance-based progress bar, the vehicle may display captured images in a panorama image format. For example, when the progress bar 320 is a distance-based progress bar, the vehicle may display the first image sequence on the first display unit in a panorama image format and display the second image sequence on the second display unit in a panorama image format.

In addition, when the progress bar 320 is a distance-based progress bar, a position of an image indicator on the progress bar 320 may indicate a distance from a location where a current image displayed on the display unit is captured, i.e. a point where image capture begins.

Referring to (c) of FIG. 3, although a progress bar 330 is a time-based progress bar, a distance may be further displayed on the progress bar 330. Referring to (d) of FIG. 3, although a progress bar 340 is a distance-based progress bar, time may be further displayed on the progress bar 340. In this case, a position of an image indicator may indicate time when a current image displayed on the display unit is captured and a location where the current image is captured. In this way, a user may check the image capture time as well as the image capture location.

Although the vehicle of the present specification will be described below about the case in which the plural camera units include the first camera unit and the second camera unit and the plural display units include the first display unit and the second display unit, the following description may be equally applied to the case in which the plural camera units include three or more camera units and the plural display units include three or more display units.

FIG. 4 shows a method of displaying an image sequence and a control interface by the vehicle according to one embodiment of the present specification.

Referring to FIG. 4, as the vehicle moves, plural images at the left of the vehicle may be captured at a predetermined first frame rate via the first camera unit and plural images at the right of the vehicle may be captured at a predetermined second frame rate via the second camera unit. Here, the first frame rate and the second frame rate may be the same frame rate. That is, as the vehicle moves, the vehicle may capture images of landscape at the left and the right thereof at a predetermined frame rate. An image set including the plural images captured by the first camera unit may be referred to as a first image sequence 10 and an image set including the plural images captured by the second camera unit may be referred to as a second image sequence 20. In this case, the first image sequence 10 and the second image sequence 20 may respectively include sequence information regarding an image display sequence, location information regarding an image capture location and time information regarding image capture time. Here, the location information may be GPS information.

When a progress bar is a distance-based progress bar, the vehicle may further detect a movement speed of the vehicle via the sensor unit and adjust the first frame rate and the second frame rate based on the movement speed. In one example, when a movement speed of the vehicle is equal or greater than a threshold speed, the vehicle may capture images at a faster frame rate than the predetermined first frame rate and the predetermined second frame rate. In another example, when a movement speed of the vehicle is equal to the threshold speed, the vehicle may capture images at the same frame rate as the predetermined first frame rate and the predetermined second frame rate. In a further example, when a movement speed of the vehicle is less than the threshold speed, the vehicle may capture images at a slower frame rate than the predetermined first frame rate and the predetermined second frame rate. In this way, the vehicle may acquire a constant quantity of image information with respect to a specific movement section regardless of a movement speed of the vehicle.

The vehicle may display the plural images included in the first image sequence 10 on a first display unit 410 based on sequence information and display the plural images included in the second image sequence 20 on a second display unit 420 based on sequence information. For example, the vehicle may sequentially display the images included in the first image sequence 10 on the first display unit 410 based on an image capture sequence and display the images included in the second image sequence 20 on the second display unit 420 based on an image capture sequence. Here, a first arrow indicates an image capture sequence of the first image sequence 10 and the second arrow indicates an image capture sequence of the second image sequence 20. That is, in the first image sequence 10, the leftmost image is the firstly captured image and the rightmost image is the last captured image. In addition, in the second image sequence 20, the rightmost image is the firstly captured image and the leftmost image is the last captured image.

In this case, the vehicle may display the captured images in real time, or may display the captured images with a predetermined time delay. In this case, the vehicle may display plural images in a video format or in a panorama image format.

The vehicle may further display a first control interface including a progress bar corresponding to the first image sequence 10 and display a second control interface including a progress bar corresponding to the second image sequence 20. In the following description, the progress bar corresponding to the first image sequence 10 is referred to as a first progress bar and the progress bar corresponding to the second image sequence 20 is referred to as a second progress bar.

Here, the first progress bar 31 may indicate a progress state of images included in the first image sequence 10 and the second progress bar 32 may indicate a progress state of images included in the second image sequence 20. In this case, the progress state may refer to an image capture progress state or a vehicle driving progress state. For example, when the progress bar is a time-based progress bar, the progress state may be an image capture progress state. In another example, when the progress bar is a distance-based progress bar, the progress state may be a vehicle driving progress state.

The first progress bar 31 and the second progress bar 32 may respectively include image indicators thereon. In the following description, the image indicator on the first progress bar 31 is referred to as a first image indicator 41 and the image indicator on the second progress bar 32 is referred to as a second image indicator 42. Here, the first image indicator 41 on the first progress bar 31 indicates the state of a current image displayed on the first display unit 410, and the second image indicator 42 on the second progress bar 32 indicates the state of a current image displayed on the second display unit 420. In this case, the state of the current image may mean the capture time of the current image or the capture location of the current image. In one example, when the progress bar is a time-based progress bar, the state of the current image may be the capture time of the current image. In another example, when the progress bar is a distance-based progress bar, the state of the current image may be a distance from a captured location of the current image, i.e. a capture start point to a point where the current image is captured.

The first progress bar 31 as described above may be located at a first start point when image capture by the first camera unit begins, and the second progress bar 32 as described above may be located at a second start point when image capture by the second camera unit begins.

The first image indicator 41 on the first control interface may be moved in a first direction on the first progress bar 31 as the images included in the first image sequence 10 are sequentially displayed, and the second image indicator 42 on the second control interface may be moved in a second direction on the second progress bar 32 as the images included in the second image sequence 20 are sequentially displayed. Here, the first direction and the second direction may be opposite to each other. For example, assuming that the first direction is a direction from the left to the right, the second direction may be a direction from the right to the left. That is, the first image indicator 41 and the second image indicator 42 may be moved in different directions as captured images are sequentially displayed. In this way, the vehicle of the present specification may provide the user with an intuitive control interface in consideration of a progress direction of the vehicle and a position of the display unit.

Figure 4A:
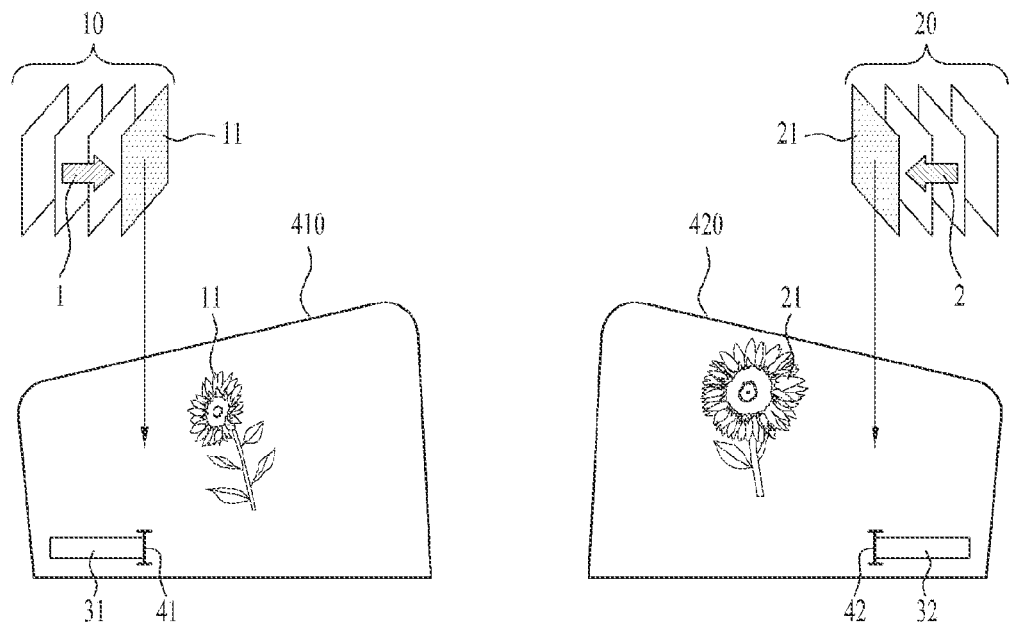
FIGS. 4A-4C show a method of displaying an image sequence and a control interface by the vehicle according to one embodiment of the present specification.

Referring to FIG. 4A, when a first time duration has passed from time when image capture begins or when the vehicle moves by a first distance from a point where image capture begins, the vehicle may cause progress of the first progress bar 31 from the first start point in the first direction by a first interval and cause progress of the second progress bar 32 from the second start point in the second direction by the first interval. As exemplarily shown, the first start point may be a left end point of the first progress bar 31 and the second start point may be a right end point of the second progress bar. In addition, the first direction may be a direction from the left to the right and the second direction may be a direction from the right to the left.

In this case, the user may check image capture progress based on a progress degree of the progress bar. In addition, the user may check vehicle driving progression based on a progress degree of the progress bar.

In addition, the vehicle may display the first image indicator 41 on the first progress bar 31 and display the second image indicator 42 on the second progress bar 32. Here, a position of the first image indicator 41 may correspond to the capture time or the capture location of a current image 11 displayed on the first display unit 410 and a position of the second image indicator 42 may correspond to the capture time or the capture location of a current image 21 displayed on the second display unit 420. In this case, the current image 11 displayed on the first display unit 410 and the current image 21 displayed on the second display unit 420 may respectively be images captured at the left and the right of the vehicle by the first camera unit and the second camera unit at the same time or at the same location.

In one example, when the progress bar is a time-based progress bar, a position of the first image indicator 41 may indicate the capture time of the current image 11 displayed on the first display unit 410 and a position of the second image indicator 42 may indicate the capture time of the current image 21 displayed on the second display unit 420. In another example, when the progress bar is a distance-based progress bar, a position of the first image indicator 41 may indicate the capture location of the current image 11 displayed on the first display unit 410 and a position of the second image indicator 42 may indicate the capture location of the current image 21 displayed on the second display unit 420.

In the following description of FIGS. 4B and 4C, a description related to parts overlapping content described with regard to FIG. 4A will be omitted.

Figure 4B:
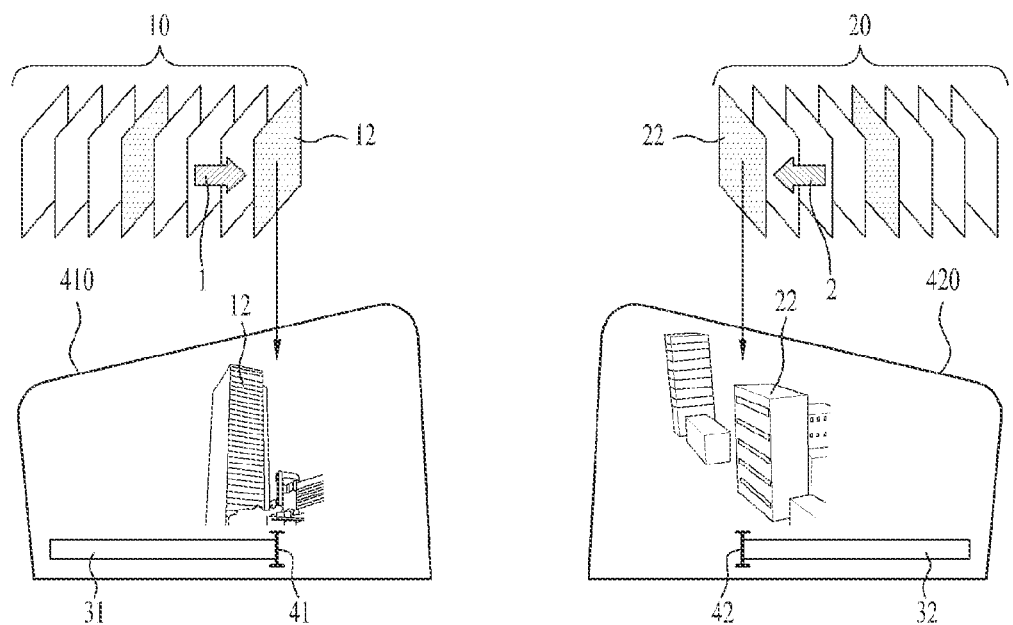

Referring to FIG. 4B, when a second time duration has passed from time when image capture begins or when the vehicle moves by a second distance from a point where image capture begins, the vehicle may cause progress of the first progress bar 31 from the first start point in the first direction by a second interval and cause progress of the second progress bar 32 from the second start point in the second direction by the second interval.

Here, a position of the first image indicator 41 may correspond to the capture time or the capture location of a current image 12 displayed on the first display unit 410 and a position of the second image indicator 42 may correspond to the capture time or capture location of a current image 22 displayed on the second display unit 420.

Figure 4C:
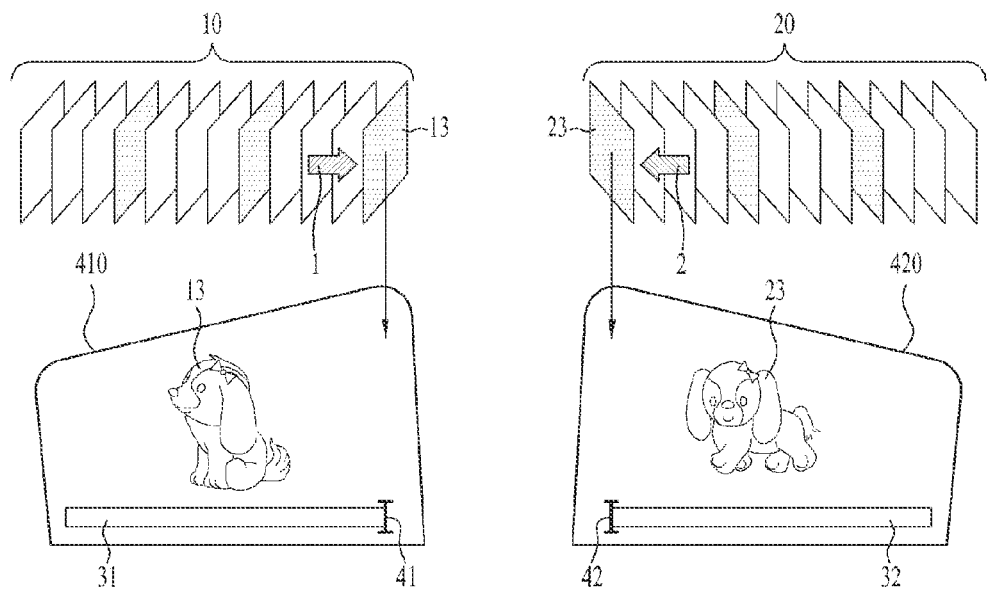

Referring to FIG. 4C, when a third time duration has passed from time when image capture begins or when the vehicle moves by a third distance from a point where image capture begins, the vehicle may cause progress of the first progress bar 31 from the first start point in the first direction by a third interval and cause progress of the second progress bar 32 from the second start point in the second direction by the third interval.

Here, a position of the first image indicator 41 may correspond to the capture time or the capture location of a current image 13 displayed on the first display unit 410 and a position of the second image indicator 42 may correspond to the capture time or the capture location of a current image 23 displayed on the second display unit 420.

As exemplarily shown in FIGS. 4A to 4C, when captured images are displayed in real time, the first image indicator 41 and the second image indicator 42 may be located respectively at an end point of the first progress bar 31, i.e. a first end point and at an end point of the second progress bar 32, i.e. a second end point, and may be moved in synchronization with progress of the first end point and the second end point. As exemplarily shown, the first end point designates a right end point of the first progress bar 31 and the second end point designates a left end point of the second progress bar 32. This is merely given in one embodiment and the vehicle of the present specification is not limited by the embodiment. That is, when captured images are not displayed in real time, the first image indicator 41 and the second image indicator 42 may be displayed at specific points on the progress bars differently from illustration of the drawing.

Figure 5:
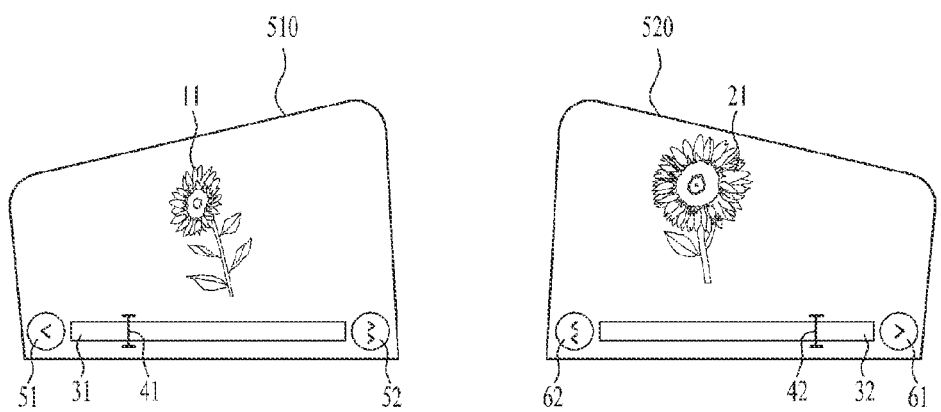
FIG. 5 shows a method of displaying an image sequence and a control interface by the vehicle according to another embodiment of the present specification.

FIG. 5 shows a method of displaying an image sequence and a control interface by the vehicle according to another embodiment of the present specification.

Referring to FIG. 5, a control interface may include a control object to control display of images. The control interface may include a first control object and a second control object. In the following description, the first control object is referred to as a first object 51 or 61 and the second control object is referred to as a second object 52 or 62.

Here, the first object 51 or 61 configured to control operation to display a past image, which precedes a current image displayed on the display unit in time, and the second object 52 or 62 configured to control operation to display a future image, which follows the current image displayed on the display unit in time. Here, the past image and the future image are relative time concepts discriminated based on the current image displayed on the display unit and are not absolute time concepts.

The first control interface and the second control interface may respectively include the first object 51 or 61 and the second object 52 or 62. Here, the first object 51 on the first control interface may be displayed at the left of the second object 52 on the first control interface. In addition, the first object 61 on the second control interface may be displayed at the right of the second object 62 on the second control interface. That is, the arrangement of the first object 51 and the second object 52 on the first control interface displayed on a first display unit 510 may be different from the arrangement of the first object 61 and the second object 62 on the second control interface displayed on a second display unit 520. In this way, the vehicle of the present specification may provide the user with an intuitive control interface in consideration of a progress direction of the vehicle and a position of the display unit.

When control input to the first object 51 on the first control interface is detected, the vehicle may control display of an image such that a past image, which precedes a current image 11 displayed on the first display unit 510 in time, will be displayed on the first display unit 510. Here, the control input may include touch input, gesture input and input using an input device, such as a mouse, etc. For example, when control input to the first object 51 on the first control interface is detected, the vehicle may control display of images such that a past image, which is captured earlier than the current image 11 displayed on the first display unit 510 by a predetermined time interval (for example, 10 seconds) or by a predetermined distance (for example, 10 cm), will be displayed on the first display unit 510. In addition, when control input to the first object 61 on the second control interface is detected, the vehicle may control display of images such that a past image, which precedes the current image 21 displayed on the second display unit 520 in time, will be displayed on the second display unit 520.

In addition, when control input to the second object 52 on the first control interface is detected, the vehicle may control display of images such that a future image, which follows the current image 11 displayed on the first display unit 510 in time, will be displayed on the first display unit 510. For example, when control input to the second object 52 on the first control interface is detected, the vehicle may control display of images such that a future image, which is captured later than the current image 11 displayed on the first display unit 510 by a predetermined time interval (for example, 10 seconds) or by a predetermined distance (for example, 10 cm), will be displayed on the first display unit 510. In addition, when control input to the second object 62 on the second control interface is detected, the vehicle may control display of images such that a future image, which follows the current image 21 displayed on the second display unit 520 in time, is displayed on the second display unit 520.

Figure 6A:
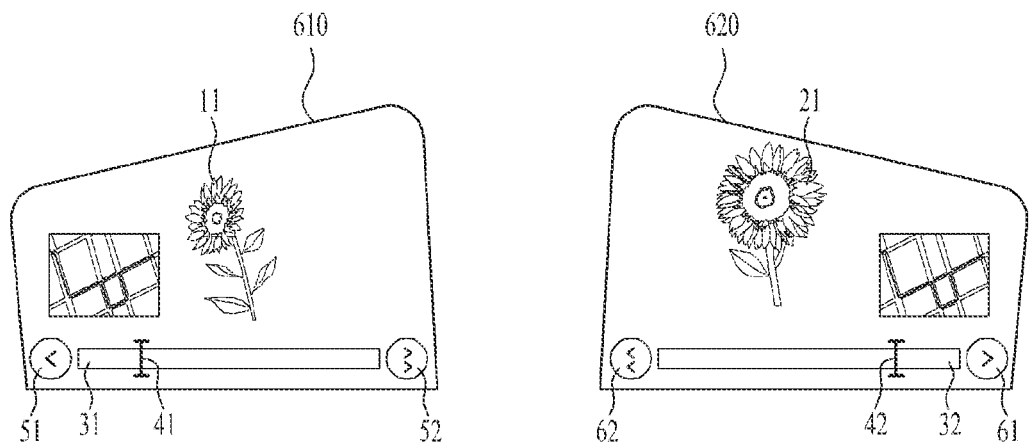
FIGS. 6A-6B show a method of displaying an image sequence, a control interface and a path interface together by the vehicle according to one embodiment of the present specification.
Figure 6B:
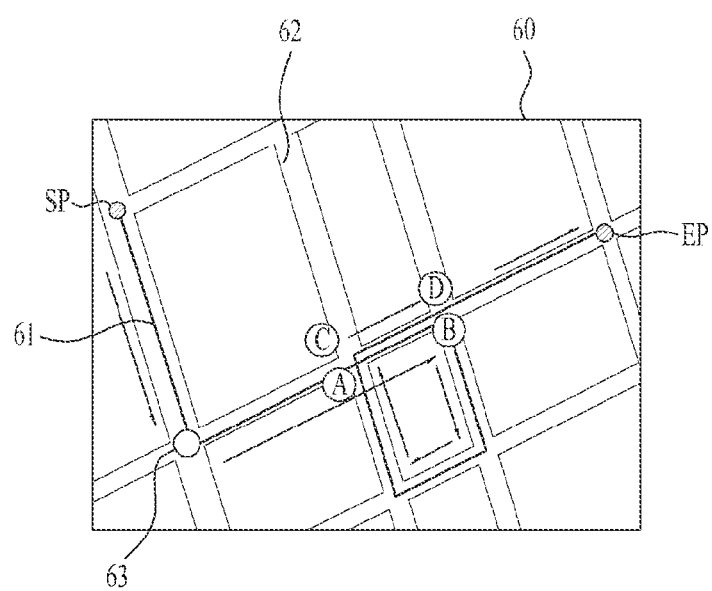

FIG. 6 shows a method of displaying an image sequence, a control interface and a path interface together by the vehicle according to one embodiment of the present specification. More specifically, FIG. 6A shows a method of displaying a first control interface and a first path interface on a first display unit and displaying a second control interface and a second path interface on a second display unit by the vehicle. In addition, FIG. 6B shows the path interface shown in FIG. 6A in enlarged scale.

Referring to FIGS. 6A and 6B, the vehicle may display a path interface 60 indicating a movement path of the vehicle on the display unit. For example, the vehicle may display the same path interface 60 on a first display unit 610 and on a second display unit 620. In the following description, a path interface displayed on the first display unit 610 is referred to as a first path interface and a path interface displayed on the second display unit 620 is referred to as a second path interface.

The path interface 60 may be a map-based interface. The path interface 60 may include a movement path 61 of the vehicle, a map image 62 corresponding to the movement path 61 and a vehicle indicator 63 indicating a progress state of the vehicle on the movement path 61.

In one example, the movement path 61 may be an expected movement path connecting a start point SP and an end point EP to each other based on a destination input by the user. In another example, the movement path 61 may be a real movement path of the vehicle.

When the movement path 61 is an expected movement path, the vehicle may display the expected movement path and the entire progress bar 31 or 32 corresponding to the expected movement path and display the vehicle indicator 63 on the expected movement path and the image indicator 41 or 42 on the entire progress bar 31 or 32 such that positions of the indictors vary according to progress of the vehicle.

In addition, when the movement path 61 is an expected movement path, a past image, which precedes the current image 11 or 21 displayed on the display unit in time, may be an image captured earlier than the current image 11 or 21, and a future image, which follows the current image 11 or 21 displayed on the display unit in time, may be an image corresponding to the expected movement path, the future image being acquired from a predefined storage unit.

Here, the past image and the future image, as described above, may be relative concepts discriminated by the current image 11 or 21. For example, a past image on the first display unit 610 may refer to images corresponding to a left section of the first progress bar 31 on the basis of the first image indicator 41 and a future image on the first display unit 610 may refer to images corresponding to a right section of the first progress bar 31 on the basis of the first image indicator 41. In addition, a past image on the second display unit 620 may refer to images corresponding to a right section of the second progress bar 32 on the basis of the second image indicator 42 and a future image on the second display unit 620 may refer to images corresponding to a left section of the second progress bar 32 on the basis of the second image indicator 42.

Here, the storage unit may be an internal storage unit included in the vehicle of the present specification, or may be an external storage unit included in an external device. When the storage unit is the external storage unit, the vehicle may acquire an image corresponding to an expected movement path from the external storage unit via wired or wireless communication. For example, the vehicle may acquire a Google street view image corresponding to an expected movement path from the external storage unit via wired or wireless communication. In addition, the vehicle may store image information regarding a captured image in the internal storage unit or the external storage unit.

When the movement path 61 is a real movement path, as exemplarily shown in FIGS. 4A to 4C, the vehicle may progress the real movement path and the progress bar based on position information of the vehicle in synchronization with progress of the vehicle. In addition, the vehicle may vary and display a position of the vehicle indicator on the real movement path and a position of the image indicator on the progress bar in synchronization with progress of the vehicle. When captured images are displayed in real time, a position of the vehicle indicator is moved along with an end point of the real movement path and a position of the image indicator is moved along with an end point of the progress bar.

In this case, an image corresponding to a current position of the first vehicle indicator on the first path interface may be equal to an image corresponding to a current position of the first image indicator on the first control interface. In addition, an image corresponding to a current position of the second vehicle indicator on the second path interface may be equal to an image corresponding to a current position of the second image indicator on the second control interface. In this way, the user may check the capture time as well as the capture location of the current image displayed on the display unit.

In addition, the movement path 61 may include an overlapping movement section. For example, as exemplarily shown in FIG. 6B, the movement path 61 may include a section A-B and a section C-D which overlap each other to define an overlapping movement section.

When a current movement section of the movement path 61 overlaps a past movement section of the movement path 61, the vehicle may again display an image, which was displayed in the past movement section, in the current movement section. For example, the vehicle may display an image, which was displayed in the past movement section, i.e. in the section A-B, in the current movement section, i.e. in the section C-D. In this way, the vehicle may prevent power consumption due to repeated image capture in the overlapping movement section.

When an image captured in the current movement section is substantially equal to an image displayed in the past movement section that overlaps the current movement section, the vehicle may stop display of an image sequence. For example, when an image captured in the current movement section, i.e. in the section C-D is substantially equal to an image captured in the past movement section, i.e. the section A-B that overlaps the current movement section, the vehicle may stop display of an image sequence. In this case, the vehicle may judge whether or not the current image and the past image are substantially equal to each other using a predetermined image analysis algorithm. In this way, the user may carefully observe a real image seen from a car window.

In the following description related to path interfaces shown in the respective drawings, a description related to content overlapping the above description related to the path interface of FIG. 6 will be omitted.

FIG. 7 shows a method of displaying an image sequence, a control interface and a path interface together by the vehicle according to another embodiment of the present specification. In the following description related to a control interface and a path interface of FIG. 7, a description related to parts overlapping those of FIGS. 4 to 6 will be omitted.

Figure 7A:
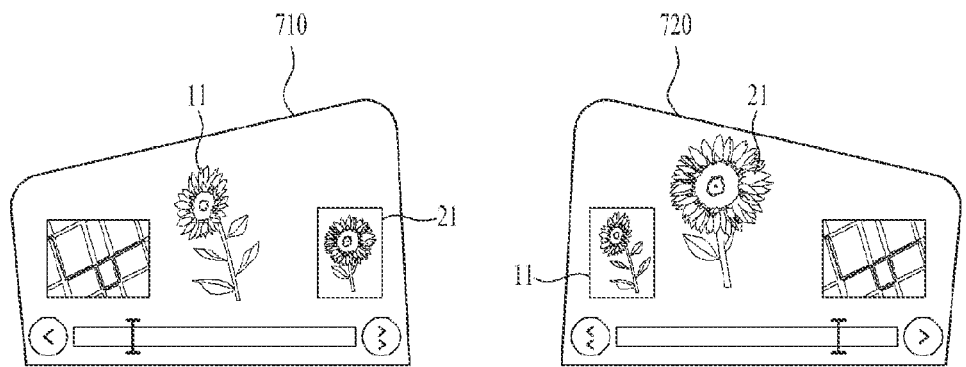
FIGS. 7A-7B show a method of displaying an image sequence, a control interface and a path interface together by the vehicle according to another embodiment of the present specification.

Referring to FIG. 7A, the vehicle may display a first image sequence on a first area of a first display unit 710 and display a second image sequence on a second area of the first display unit 710. As exemplarily shown, at least one image 11 included in the first image sequence may be displayed on the first area of the first display unit 710 and at least one image 21 included in the second image sequence may be displayed on the second area of the first display unit 710.

Here, the first area of the first display unit 710 may be wider than the second area of the first display unit 710. For example, the first area of the first display unit 710 may be a main display area and the second area of the first display unit 710 may be an auxiliary display area. That is, the vehicle may display the first image sequence including plural images captured by a first camera unit associated with the first display unit 710 on the main display area and additionally display the second image sequence including plural images captured by a second camera unit not associated with the first display unit 710 on the auxiliary display area.

Thereby, the user may simultaneously check the images captured by the first and second camera units by observing only the first display unit. Note that an image to be controlled via a first control interface may be limited to the image included in the first image sequence.

In addition, the vehicle may display the second image sequence on a first area of a second display unit 720 and display the first image sequence on a second area of the second display unit 720. As exemplarily shown, at least one image 21 included in the second image sequence may be displayed on the first area of the second display unit 720 and at least one image 11 included in the first image sequence may be displayed on the second area of the second display unit 720.

Here, the first area of the second display unit 720 may be wider than the second area of the second display unit 720. For example, the first area of the second display unit 720 may be a main display area and the second area of the second display unit 720 may be an auxiliary display area.

Thereby, the user may simultaneously check the images captured by the first and second camera units by observing only the second display unit. Note that an image to be controlled via a second control interface may be limited to the image included in the second image sequence.

Figure 7B:
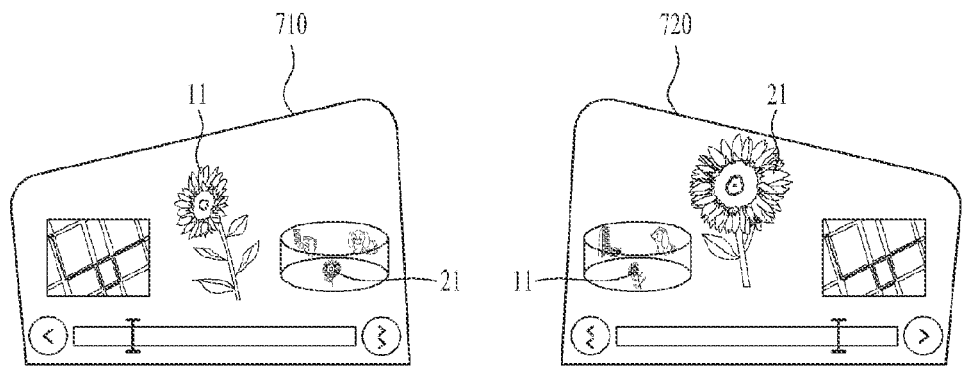

Referring to FIG. 7B, the vehicle may display the first image sequence on the first area of the first display unit 710 and display the second image sequence on a third area of the first display unit 710 in a 360° image format. Here, the 360° image format may be a format that displays plural images included in an image sequence by interconnecting the same in loop form without overlapping regions.

In addition, the vehicle may display the second image sequence on the first area of the second display unit 720 and display the first image sequence on a third area of the second display unit 720 in a 360° image format.

Figure 8A:
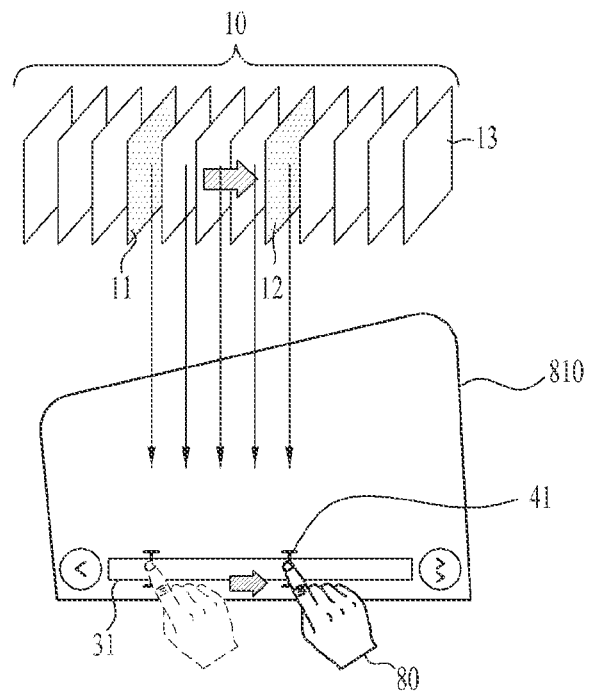
FIGS. 8A-8B show a method of displaying an image sequence by the vehicle when an image indicator or a vehicle indicator is moved based on control input according to one embodiment of the present specification.
Figure 8B:
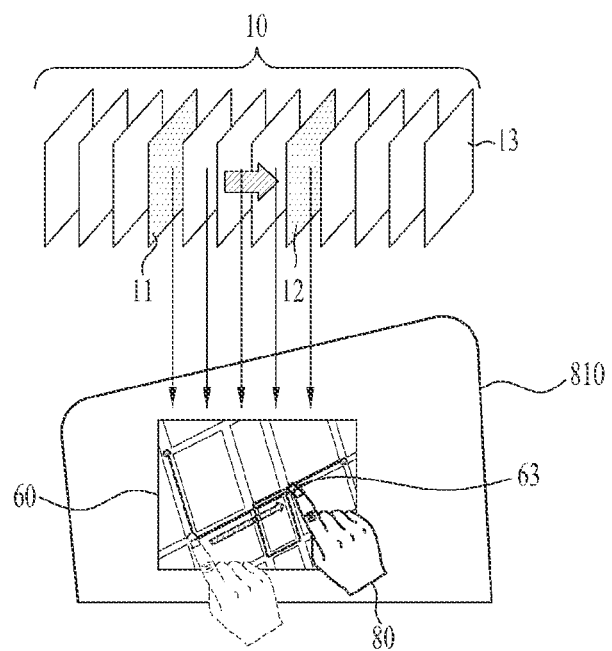

FIG. 8 shows a method of displaying an image sequence by the vehicle when an image indicator or a vehicle indicator is moved based on control input according to one embodiment of the present specification. Although FIGS. 8A and 8B show a first image indicator and a first vehicle indicator displayed on a first display unit and a related description focuses on the illustration, the following description may be equally applied to a second image indicator and a second vehicle indicator displayed on a second display unit.

Referring to FIG. 8A, the vehicle may detect control input to an image indicator. Here, the control input may include touch input, gesture input and input using an input device, such as a mouse, etc. In addition, the image indicator may be moved on a progress bar based on the control input. Here, this movement may be continuous movement or discontinuous movement.

According to one embodiment, the vehicle may detect control input of sliding an image indicator on a control interface. Here, sliding may refer to continuous movement of a sliding object. The control input of sliding the sliding object may take various forms, such as touch and drag, click and drag, pointer movement, direction change interface (for example, direction change key) input, predetermined gesture and the like according to the kind of user input. According to another embodiment, the vehicle may detect control input of discontinuously moving the image indicator on the control interface. Here, the control input of discontinuously moving the image indicator may be control input of touching a specific point on a progress bar.

The image indicator on the control interface may be moved on the progress bar based on the control input. In one example, as exemplarily shown in FIG. 8A, the first image indicator 41 on the first control interface may slide from a first point to a second point on the first progress bar 31 based on control input of sliding the first image indicator 41. Likewise, the second image indicator on the second control interface may slide on the second progress bar based on control input of sliding the second image indicator. In another example, the first image indicator 41 on the first control interface may be discontinuously moved from the first point to the second point on the first progress bar 31 based on control input of touching the first image indicator 41.

Once the image indicator is moved from the first point to the second point based on the control input, the vehicle may display an image corresponding to the second point on the display unit. In this case, when the control input is sliding input, the vehicle may continuously display a change procedure from an image corresponding to the first point to the image corresponding to the second point on the display unit. On the other hand, when the control input is discontinuous input, the vehicle may not display a continuous change procedure from the image corresponding to the first point to the image corresponding to the second point.

For example, as exemplarily shown in FIG. 8A, when the first image indicator 41 slides from the first point to the second point based on control input, the vehicle may display an image 12 corresponding to the second point on a first display unit 810. In this case, the vehicle may continuously display a change procedure from an image 11 corresponding to the first point to the image 12 corresponding to the second point on the first display unit 810. That is, as exemplarily shown in FIG. 8A, the vehicle may continuously display three images between the image 11 corresponding to the first point and the image 12 corresponding to the second point on the first display unit 810. The above description may also be applied to the second display unit.

Referring to FIG. 8B, the vehicle may detect control input to a vehicle indicator. The vehicle indicator on a path interface may be moved on a movement path based on control input. Here, movement, as described above in FIG. 8A, may be continuous movement or discontinuous movement.

For example, the first vehicle indicator 63 on the first path interface 60 displayed on the first display unit 810 may slide or be discontinuously moved on a movement path based on control input. Likewise, the second vehicle indicator on the second path interface displayed on the second display unit may slide or be discontinuously moved on a movement path based on control input.

Once the vehicle indicator is moved from a first location to a second location based on the control input, the vehicle may display an image corresponding to the second location on the display unit. In this case, when the control input is sliding input, the vehicle may continuously display a change procedure from an image corresponding to the first location to the image corresponding to the second location on the display unit. On the other hand, when the control input is discontinuous input, the vehicle may not display a continuous change procedure from the image corresponding to the first location to the image corresponding to the second location.

For example, as exemplarily shown in FIG. 8B, when the first vehicle indicator 63 slides from the first location to the second location based on control input, the vehicle may display an image 12 corresponding to the second location on the first display unit 810. In this case, the vehicle may continuously display a change procedure from an image 11 corresponding to the first location to the image 12 corresponding to the second location on the first display unit 810. That is, as exemplarily shown in FIG. 8B, the vehicle may continuously display three images between the image 11 corresponding to the first location and the image 12 corresponding to the second location on the first display unit 810. The above description may also be applied to the second display unit.

Hereinafter, a method of displaying an image sequence and a vehicle indicator by the vehicle when an image indicator or the vehicle indicator is moved based on control input of sliding the indicator will be described with reference to FIGS. 9 and 10. The following description may be equally applied to the case in which control input is discontinuous input, except for differences between continuous movement and discontinuous movement as described above in FIG. 8.

FIG. 9 shows a method of displaying an image sequence and a vehicle indicator by the vehicle when an image indicator is moved according to one embodiment of the present specification. Here, movement may be continuous movement or discontinuous movement as described above in FIG. 8A.

Referring to FIG. 9A, the vehicle may detect control input of sliding the first image indicator 41 on the first progress bar 31. When the first image indicator 41 on the first progress bar 31 slides in a first direction based on the control input, the vehicle may slide the first vehicle indicator 63 on the first path interface 60 in a second direction. Here, the first direction may refer to a rightward sliding direction of the first image indicator 41 from a current position. In addition, the second direction may refer to a sliding direction of the first vehicle indicator 63 from a current position to an end point in a movement path of the vehicle.

In addition, the vehicle may detect control input of sliding the second image indicator 42 on the second progress bar 32. When the second image indicator 42 on the second progress bar 32 slides in the first direction based on the control input, the vehicle may slide the second vehicle indicator 73 on the second path interface 70 in a direction opposite to the second direction. Here, the first direction may refer to a rightward sliding direction of the second image indicator 42 from a current position. In addition, the second direction may refer to a sliding direction of the second vehicle indicator 73 from a current position to an end point in a movement path of the vehicle.

That is, even if the first image indicator 41 on the first control interface and the second image indicator 42 on the second control interface slide in the same direction, the first vehicle indicator 63 on the first path interface and the second vehicle indicator 73 on the second path interface may slide in different directions. In this way, the vehicle of the present specification may provide the user with intuitive control interface and path interface in consideration of a progress direction of the vehicle and a position of the display unit.

Figure 9B:
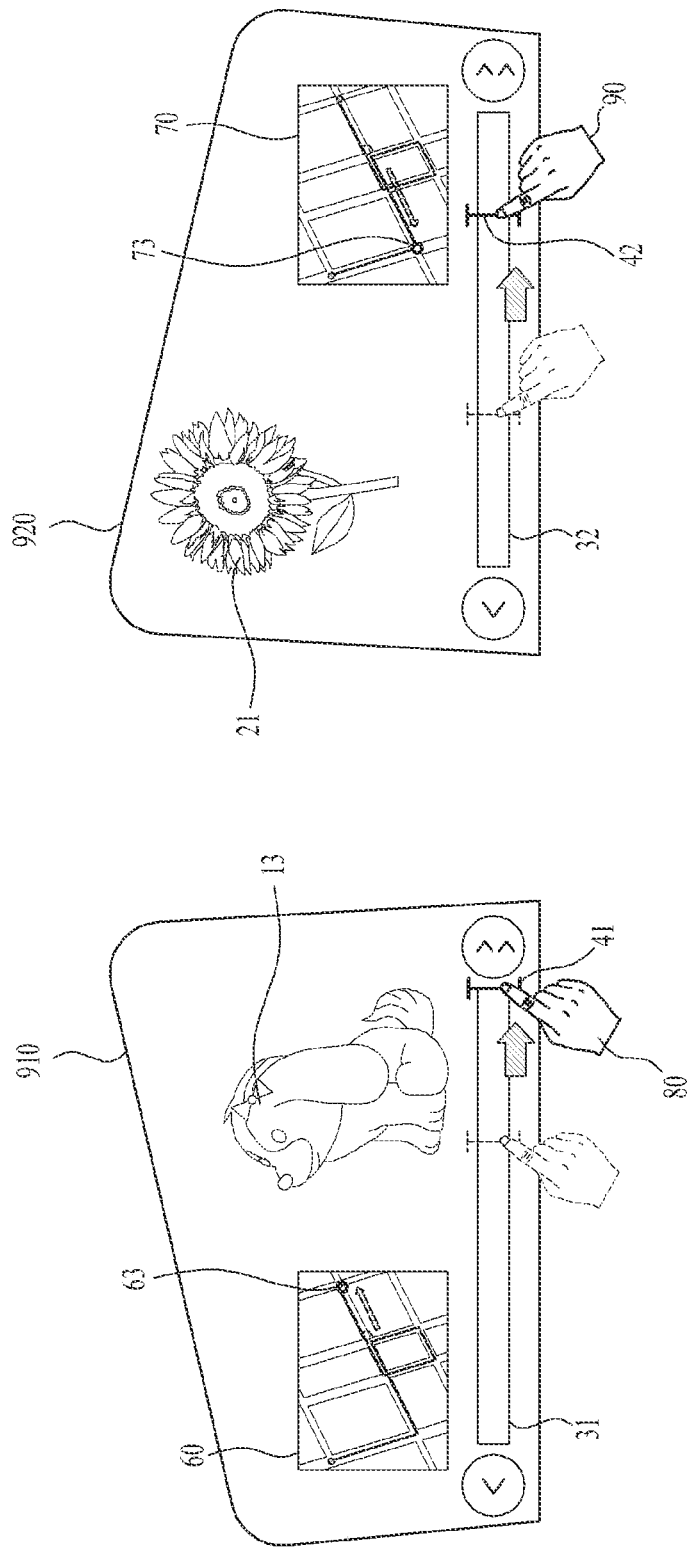

Referring to FIG. 9B, the vehicle may detect the end of sliding of the first image indicator 41. When the end of sliding of the first image indicator 41 is detected, the vehicle may display an image 13 corresponding to a sliding end point of the first image indicator 41 on a first display unit 910. In this case, the vehicle may continuously display a change procedure from the image 12 corresponding to a sliding start point of the first image indicator 41 to the image 13 corresponding to the sliding end point of the first image indicator 41. Here, when a first direction is a rightward sliding direction of the first image indicator 41 from a current position, the vehicle may sequentially display future images, which follow a current image displayed on the display unit in time, as sliding is progressed.

In addition, the vehicle may detect the end of sliding of the second image indicator 42. When the end of sliding of the second image indicator 42 is detected, the vehicle may display an image 21 corresponding to a sliding end point of the second image indicator 42. In this case, the vehicle may continuously display a change procedure from the image 22 corresponding to a sliding start point of the second image indicator 42 to the image 21 corresponding to the sliding end point of the second image indicator 42. Here, when a first direction is a rightward sliding direction of the second image indicator 42 from a current position, the vehicle may sequentially display past images, which precede a current image displayed on the display unit in time, as sliding is progressed.

That is, even if the first image indicator 41 on the first control interface and the second image indicator 42 on the second control interface slide in the same direction, the vehicle may sequentially display future images, which follow a displayed current image in time, on the first display unit 910 and sequentially display past images, which precede the displayed current image in time, on a second display unit 920. In this way, the vehicle of the present specification may provide the user with intuitive image display in consideration of a progress direction of the vehicle and a position of the display unit.

FIG. 10 shows a method of displaying an image sequence and an image indicator by the vehicle when a vehicle indicator is moved according to one embodiment of the present specification.

Referring to FIG. 10A, the vehicle may detect control input of sliding the first vehicle indicator 63 on the first path interface 60. When the first vehicle indicator 63 on the first path interface 60 slides in a second direction based on the control input, the vehicle may slide the first image indicator 41 on the first progress bar 31 in a first direction. Here, the first direction may refer to a rightward sliding direction of the first image indicator 41 from a current position. In addition, the second direction may refer to a sliding direction of the first vehicle indicator 63 from a current position to an end point in a movement path of the vehicle.

In addition, the vehicle may detect control input of sliding the second vehicle indicator 73 on the second path interface 70. When the second vehicle indicator 73 on the second path interface 70 slides in a second direction based on the control input, the vehicle may slide the second image indicator 42 on the second progress bar 32 in a direction opposite to the first direction. Here, the first direction may refer to a rightward sliding direction of the second image indicator 42 from a current position. In addition, the second direction may refer to a sliding direction of the second vehicle indicator 73 from a current position to an end point in a movement path of the vehicle.

That is, even if the first vehicle indicator 63 on the first path interface and the second vehicle indicator 73 on the second path interface slide in the same direction, the first image indicator 41 on the first control interface and the second image indicator 42 on the second control interface may slide in different directions. In this way, the vehicle of the present specification may provide the user with intuitive control interface and path interface in consideration of a progress direction of the vehicle and a position of the display unit.

Referring to FIG. 10B, the vehicle may detect the end of sliding of the first vehicle indicator 63. When the end of sliding of the first vehicle indicator 63 is detected, the vehicle may display the image 11 corresponding to a sliding end point of the first vehicle indicator 63 on a first display unit 1010. In this case, the vehicle may continuously display a change procedure from the image 12 corresponding to a sliding start point of the first vehicle indicator 63 to the image 11 corresponding to the sliding end point of the first vehicle indicator 63. Here, when a second direction is a sliding direction of the first vehicle indicator 63 from a current position to an end point in a movement path of the vehicle, the vehicle may sequentially display future images, which follow a current image displayed on the display unit in time, as sliding is progressed.

In addition, the vehicle may detect the end of sliding of the second vehicle indicator 73. When the end of sliding of the second vehicle indicator 73 is detected, the vehicle may display an image 21 corresponding to a sliding end point of the second vehicle indicator 73 on a second display unit 1020. In this case, the vehicle may continuously display a change procedure from the image 22 corresponding to a sliding start point of the second vehicle indicator 73 to the image 21 corresponding to the sliding end point of the second vehicle indicator 73. Here, when a second direction is a sliding direction of the second vehicle indicator 42 from a current position to an end point in a movement path of the vehicle, the vehicle may sequentially display future images, which follow a current image displayed on the display unit in time, as sliding is progressed.

That is, even if the first vehicle indicator 63 on the first path interface 60 and the second vehicle indicator 73 on the second path interface 70 slide in the same direction, the vehicle may sequentially display future images, which follow a displayed current image in time, on the first display unit 1010 and the second display unit 1020. In this way, the vehicle of the present specification may provide the user with intuitive image display in consideration of a progress direction of the vehicle and a position of the display unit.

FIG. 11 is a flowchart of a control method of a vehicle according to one embodiment of the present specification. In the following description of the flowchart, a description related to parts overlapping the above description of FIGS. 1 to 9 will be omitted.

Referring to FIG. 11, the vehicle may capture plural images using a first camera unit as described above in FIGS. 1 and 2 (S1110). In addition, as described above in FIGS. 1 and 2, the vehicle may capture plural images using a second camera unit (S1120). In this case, the first camera unit and the second camera unit may be installed to face opposite directions. For example, the first camera unit may be installed to face the left of the vehicle and the second camera unit may be installed to face the right of the vehicle. In addition, the first camera unit and the second camera unit may be installed to capture images respectively in two directions perpendicular to a progress direction of the vehicle. For example, the first camera unit may be installed to capture plural images at the left of the vehicle and the second camera unit may be installed to capture plural images at the right of the vehicle.

In this case, when the vehicle begins to drive, the first camera unit and the second camera unit may be activated. In addition, when the vehicle is not moved for a predetermined time or more, the first camera unit and the second camera unit may be deactivated.

Next, as described above in FIGS. 3 to 7, the vehicle may display a first image sequence including the plural images captured by the first camera unit and a first control interface to control display of the first image sequence on a first display unit (S1130). In addition, as described above in FIGS. 3 to 7, the vehicle may display a second image sequence including the plural images captured by the second camera unit and a second control interface to control display of the second image sequence on a second display unit (S1140).

Here, the first display unit and the second display unit may be located in directions facing each other. In this case, the first display unit and the second display unit may respectively display the first image sequence and the second image sequence in a video format or in a panorama image format. Here, the panorama image format may refer to a format that displays plural images included in an image sequence by stitching the plural images into one image without overlapping regions.

Here, each of the first control interface and the second control interface may include a progress bar, a first object and a second object. In this case, the first object configured to control operation to display a past image, which precedes a current image displayed on the first display unit or the second display unit in time, and the second object configured to control operation to display a future image, which follows a current image displayed on the first display unit or the second display unit in time.

In addition, the first object on the first control interface may be displayed at the left of the second object on the first control interface, and the first object on the second control interface may be displayed at the right of the second object on the second control interface.

In addition, as described above in FIG. 3, the progress bar may be a time-based progress bar or a distance-based progress bar.

In addition, as described above in FIGS. 6 and 7, the first display unit and the second display unit may further display the same path interface that indicates a movement path of the vehicle. In this case, the path interface may include a vehicle indicator that indicates a movement path of the vehicle, a map image corresponding to the movement path of the vehicle and the state of the vehicle on the movement path.

In addition, as described above with reference to FIGS. 8 to 10, the vehicle may detect control input to the first display unit and the second display unit via a sensor unit. For example, the vehicle may detect control input of controlling the first object and the second object on the first control interface or the second control interface via the sensor unit. In addition, the vehicle may detect control input of controlling a first image indicator on the first control interface and a second image indicator on the second control interface via the sensor unit. In addition, the vehicle may detect control input of controlling a first vehicle indicator on the first path interface or a second vehicle indicator on the second path interface via the sensor unit.

As is apparent from the above description, according to the present specification, a vehicle may display images captured by a first camera unit on a first display unit and display images captured by a second camera unit on a second display unit. Thereby, the vehicle may provide display of images captured in different directions via different display units.

Further, according to the present specification, the vehicle may display images via the first display unit and the second display unit located in directions facing each other. Thereby, the vehicle may provide image display at various positions within the vehicle.

Furthermore, according to the present specification, the vehicle may differently set arrangement of control objects included in a first control interface on the first display unit and arrangement of control objects included in a second control interface on the second display unit. Thereby, the vehicle may provide intuitive user interface in consideration of a progress direction of the vehicle and a display position.

Although the preferred embodiments have been illustrated and described, those skilled in the art will appreciate that the present specification should not be limited to the above specific embodiments and various modifications thereof are possible without departing from the scope and spirit of the present specification as disclosed in the accompanying claims and these modifications should not be understood independently of the technical idea of the present specification.

The vehicle and the control method thereof according to the present specification may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

In the present specification, an angle, a distance and a direction may be understood as not only referring to accurate values, but as also including a substantial speed and a substantial direction within a given range. That is, a speed and a direction of the present specification may refer to a substantial speed and a substantial direction, and a given tolerance may be present therebetween.

In addition, both the invention of a device and the invention of a method have been described in this specification, and thus descriptions of both the inventions may be complementally applied as necessary.

What is claimed is:

1. A panoramic image system installed inside a vehicle, the panoramic image system comprising:
   a first camera unit and a second camera unit configured to capture plural images during driving of the vehicle;
   wherein the first camera unit is installed to capture images in a left direction to a progress direction of the vehicle and the second camera unit is installed to capture images in a right direction to a progress direction of the vehicle;
   a first display unit configured to display a first image sequence including the captured plural images and a first control interface controlling display of the first image sequence on the first display unit,
   wherein the first control interface includes:
      a first progress bar which is either a time-based progress bar or a distance-based progress bar, and
      a first control unit configured to detect and process incoming touch input and gesture inputs applied to the first display unit;
   a second display unit configured to display a second image sequence including the captured plural images and a second control interface controlling display of the second image sequence on the second display unit,
   wherein the second control interface includes:
      a second progress bar which is either a time-based progress bar or a distance-based progress bar, and
      a second control unit configured to detect and process incoming touch input and gesture inputs applied to the second display unit, and
   wherein the first display unit is installed in a left interior region of the vehicle and the second display unit is installed in a right interior region of the vehicle; and
   a processor configured to control the first camera unit, the second camera unit, the first display unit and the second display unit,
   wherein each of the first control interface and the second control interface includes a first object and a second object,
   wherein the first object of the first control interface is configured to control operation to display a past image on the first display unit, wherein the past image preceding a current image displayed on the first display unit in time is set based on a moving direction of the vehicle, wherein the second object of the second control interface is configured to control operation to display a future image on the second display unit, wherein the future image following the current image displayed on the second display unit in time is set based on the moving direction of the vehicle, wherein the processor is further configured to:
  display the first image sequence including plural images captured by the first camera unit and the first control interface controlling display of the first image sequence on the first display unit, and
  display the second image sequence including plural images captured by the second camera unit and the second control interface controlling display of the second image sequence on the second display unit, wherein the first object on the first control interface is displayed at the left of the second object on the first control interface, and wherein the first object on the second control interface is displayed at the right of the second object on the second control interface.

2. The panoramic image system according to claim 1, wherein each of the first control interface and the second control interface further includes an image indicator located on the respective first and second progress bars to indicate a progress state of the images.

3. The panoramic image system according to claim 2, wherein the first control interface includes a first image indicator configured to be moved in a first direction as the plural images included in the first image sequence are sequentially displayed,
  wherein the second control interface includes a second image indicator configured to be moved in a second direction as the plural images included in the second image sequence are sequentially displayed, and
  wherein the first direction and the second direction are opposite to each other.

4. The panoramic image system according to claim 1,
  wherein the processor is further configured to display the image sequence in a video format when at least one of the first and second progress bars is the time-based progress bar.

5. The panoramic image system according to claim 1,
  wherein the processor is further configured to display the image sequence in a panorama image format when at least one of the first and second progress bars is the distance-based progress bar, and
  wherein the panorama image format is a format displaying the plural images included in the first image sequence and the second image sequence by switching the images into one image without overlapping regions.

6. The panoramic image system according to claim 2, wherein the processor is further configured to:
  display a first path interface indicating a movement path of the vehicle on the first display unit, and
  display a second path interface indicating a movement path of the vehicle on the second display unit.

7. The panoramic image system according to claim 6, wherein the first path interface and the second path interface include a vehicle indicator indicating a movement path of the vehicle, a map image corresponding to the movement path and a progress state of the vehicle on the movement path.

8. The panoramic image system according to claim 7, wherein the first path interface includes a first vehicle indicator, and an image corresponding to a current position of the first vehicle indicator equal to an image corresponding to a current position of the first image indicator on the first control interface, and
  wherein the second path interface includes a second vehicle indicator and an image corresponding to a current position of the second vehicle indicator equal to an image corresponding to a current position of the second image indicator on the second control interface.

9. The panoramic image system according to claim 8, further comprising a sensor unit configured to detect control input to each of the first and second display units,
  wherein the first image indicator and the second image indicator are movable on the progress bar of the first control interface and the second control interface based on the control input, and
  wherein the vehicle indicator is movable on the movement path of the first path interface and the second path interface based on the control input.

10. The panoramic image system according to claim 9, wherein the processor is further configured to:
  slide the first vehicle indicator in a second direction when the first image indicator slides in a first direction based on the control input, and
  slide the second vehicle indicator in a direction opposite to the second direction when the second image indicator slides in the first direction based on the control input.

11. The panoramic image system according to claim 10, wherein the processor is further configured to:
  slide the first image indicator in the first direction when the first vehicle indicator slides in the second direction based on the control input, and
  slide the second image indicator in a direction opposite to the first direction when the second vehicle indicator slides in the second direction based on the control input.

12. The panoramic image system according to claim 10, wherein the first direction is a rightward sliding direction of the first image indicator or the second image indicator from a current position, and
  wherein the second direction is a sliding direction of the first vehicle indicator or the second vehicle indicator from a current position to an end point of the movement path.

13. The panoramic image system according to claim 1, wherein the first image sequence and the second image sequence include location information regarding an image capture location and time information regarding image capture time.

14. The panoramic image system according to claim 13, wherein the first image sequence and the second image sequence further include information regarding a display sequence of the plural images included in the image sequence.

15. The panoramic image system according to claim 9, wherein the sensor unit is further configured to detect a movement speed of the vehicle when the progress bar is a distance-based progress bar, and
  wherein the processor is further configured to set a frame rate for capturing the plural images based on the movement speed.

16. The panoramic image system according to claim 15, wherein the processor is further configured to:
  set the frame rate to a first rate when the movement speed is equal or greater than a threshold speed,
  set the frame rate to a second rate when the movement speed is less than the threshold speed, and
  wherein the first rate is greater than the second rate.

17. The panoramic image system according to claim 9, wherein the processor is further configured to:
- acquire location information of the vehicle using the sensor unit, and
- display an image displayed in a past movement section of the movement path in a current movement section of the movement path when the current movement section overlaps the past movement section.

18. The panoramic image system according to claim 17, wherein the processor is further configured to stop display of the first image sequence and the second image sequence when the current movement section and the past movement section overlap each other and an image captured in the current movement section and an image captured in the past movement section are substantially equal to each other.

19. The panoramic image system according to claim 9, wherein the processor is further configured to:
- display the first image sequence on the first display unit when control input to the first object on the first control interface is detected, and
- display the second image sequence on the second display unit when control input to the second object on the second control interface is detected.

20. The panoramic image system according to claim 1, wherein the processor is further configured to:
- display the second image sequence on the first display unit, and
- display the first image sequence on the second display unit.

21. The panoramic image system according to claim 20, wherein the processor is further configured to:
- display the second image sequence on the first display unit in a 360° image format, and
- display the first image sequence on the second display unit in a 360° image format.

22. The panoramic image system according to claim 1, wherein each of the first and second display units are transparent display units.

23. A control method of a panoramic image system, the panoramic image system being installed inside a vehicle, the control method comprising:
- capturing plural images using a first camera unit during driving of the vehicle;
- capturing plural images using a second camera unit during driving of the vehicle;
- displaying a first image sequence including the plural images captured by the first camera unit and a first control interface controlling display of the first image sequence on a first display unit,
- wherein the first control interface includes:
  - a first progress bar which is either a time-based progress bar or a distance-based progress bar, and
  - a first control unit configured to detect and process incoming touch input and gesture inputs applied to the first display unit; and
- displaying a second image sequence including the plural images captured by the second camera unit and a second control interface controlling display of the second image sequence on a second display unit,
- wherein the second control interface includes:
  - a second progress bar which is either a time-based progress bar or a distance-based progress bar, and
  - a second control unit configured to detect and process incoming touch input and gesture inputs applied to the second display unit,
- wherein the first camera unit is installed to capture images in a left direction to a progress direction of the vehicle and the second camera unit is installed to capture images in a right direction to a progress direction of the vehicle,
- wherein the first display unit is installed in a left interior region of the vehicle and the second display unit is installed in a right interior region of the vehicle,
- wherein each of the first control interface and the second control interface includes a first object and a second object,
- wherein the first object is configured to control operation to display a past image on the first display unit, the past image preceding a current image displayed on the first display unit in time is set based on a moving direction of the vehicle,
- wherein the second object is configured to control operation to display a future image on the second display unit,
- wherein the future image following the current image displayed on the second display unit in time is set based on the moving direction of the vehicle,
- wherein the first object on the first control interface is displayed at the left of the second object on the first control interface, and
- wherein the first object on the second control interface is displayed at the right of the second object on the second control interface.

* * * * *